United States Patent [19]

Chari

[11] Patent Number: 5,223,771
[45] Date of Patent: Jun. 29, 1993

[54] POLYPHASE BRUSHLESS DC MOTOR CONTROL

[75] Inventor: Srinivasan V. Chari, Los Gatos, Calif.

[73] Assignee: Western Digital (Singapore) Pte., Ltd., Singapore

[21] Appl. No.: 951,378

[22] Filed: Sep. 25, 1992

Related U.S. Application Data

[63] Continuation of Ser. No. 728,900, Jun. 17, 1991, abandoned.

[51] Int. Cl.⁵ ............................................. H02P 6/02
[52] U.S. Cl. .................................... 318/254; 318/138
[58] Field of Search ....................... 318/138, 254, 439

[56] References Cited

U.S. PATENT DOCUMENTS

| | | | |
|---|---|---|---|
| 4,250,435 | 2/1981 | Alley et al. | 318/138 |
| 4,262,237 | 4/1981 | Gelenius | 318/254 |
| 4,495,450 | 1/1985 | Tokizaki et al. | 318/138 |
| 4,583,028 | 4/1986 | Angersbach et al. | 318/254 |
| 4,641,066 | 2/1987 | Nagata et al. | 318/254 |
| 4,712,050 | 12/1987 | Nagasawa et al. | 318/254 |
| 4,740,734 | 4/1988 | Takeuchi et al. | 318/254 |
| 4,743,815 | 5/1988 | Gee et al. | 318/254 |
| 4,833,374 | 5/1989 | Watanabe et al. | 318/254 |
| 4,876,491 | 10/1989 | Squires et al. | 318/138 |
| 4,912,378 | 3/1990 | Vukosavic | 318/254 |
| 4,922,169 | 5/1990 | Freeman | 318/254 |
| 4,928,043 | 5/1990 | Plunkett | 318/254 |
| 4,978,895 | 12/1990 | Schwarz | 318/254 |
| 4,983,894 | 1/1991 | Oku et al. | 318/138 |
| 4,992,710 | 2/1991 | Cassat | 318/254 |
| 5,001,405 | 3/1991 | Cassat | 318/254 |
| 5,019,756 | 5/1991 | Schwarz | 318/254 |
| 5,023,528 | 6/1991 | Saidin et al. | 318/254 |
| 5,028,852 | 6/1991 | Dunfield | 318/254 |
| 5,036,264 | 7/1991 | Ueki | 318/254 |
| 5,095,254 | 3/1992 | Ueki | 318/138 |

FOREIGN PATENT DOCUMENTS

0215785 7/1988 European Pat. Off. .

*Primary Examiner*—Bentsu Ro
*Attorney, Agent, or Firm*—Skjerven, Morrill, MacPherson, Franklin & Friel

[57] ABSTRACT

A system for controlling the operation of a polyphase DC motor having a rotor and a plurality of phase windings with separate outer terminals and a common center tap terminal supplies electrical energy sequentially to the phase windings to produce rotation of the rotor relative to the phase windings. The voltage between the outer terminal of one of the phase windings and the center tap terminal is sensed during periods when that one phase winding is not energized to control the sequential supplying of electrical energy to the phase windings.

8 Claims, 6 Drawing Sheets

POLYPHASE BRUSHLESS DC MOTOR CONTROL

This application is a continuation division of application Ser. No. 07/728,900, filed Jun. 17, 1991, now abandoned.

BACKGROUND OF THE INVENTION

1. Field of the Invention

This invention relates in general to motor control systems, and relates more particularly to control systems for polyphase brushless DC motors.

2. Description of the Prior Art

The use of polyphase brushless motors is well known in a number of areas, particularly in the disk drive area where such motors are commonly used to rotate the spindle which carries the recording disk or disks.

One example of such use is shown in European Patent Application 0251785, published Jul. 1, 1988 and entitled "Electric Motor Control Method and Apparatus." That publication discloses a three-phase brushless DC motor control system in which the disk drive motor is operated in three separate stages. During the first or startup stage, short bursts of current are applied to each phase winding of the motor, and the motor current conducted in response thereto in each phase winding is measured to provide an indication of the rotational position of the rotor relative to the three phase windings to determine to which phase winding the next torque-producing current is to be applied.

After the motor reaches a predetermined speed, the motor control enters the second stage in which the back EMF of the motor and the motor current are continuously monitored as a measure of motor speed until the desired rotational speed is reached. Thereafter, in the final stage, torque producing current is sequentially applied to each phase winding in synchronization with the rotor position by deriving positional information from one of the rotating disks itself.

SUMMARY OF THE PRESENT INVENTION

This invention relates to a polyphase brushless DC motor control system operating in the Y-configuration with a center tap node where the center tap node-to-outer-terminal voltage is used for sensing and controlling the energization of the different phase windings of the motor, without using any other rotational position sensing devices or any commutational devices. Although the invention is illustrated herein in connection with a three phase motor, it will be apparent that the invention may be practiced with polyphase DC motors having any appropriate number of phases.

One feature of this invention is that less than all of the phases are used for sensing rotational position, and in the preferred embodiment, only one phase is used. Another feature of the invention is that the timing of the energization of the phases is controlled by computation. The computation is derived from the time of polarity switching of the back EMF signal of one of the phase windings when it is not energized. If the back EMF signal is too small, as at the beginning of motor rotation, predictive computation is used.

Predictive computation relies on a known starting point of rotation. This known starting point is easily achieved by energizing one phase for a reasonable time period to assure movement of the rotor to a known point. However, the direction of motion is uncontrolled and in applications such as disk recording devices, direction of disk rotation is critical since any significant reverse rotation can cause damage to either the magnetic heads or the disks, or both.

This invention further describes a method of identifying the starting point as rotational angular position zones by using the property that the inductance of the phase windings is influenced by magnetic fields of the rotor. Then, the initial energization of the phase windings can be selected to greatly reduce possible reverse direction movement of the rotor.

A further feature of this invention is that the reverse direction motion is limited by energizing the phase windings in a special sequence, which may include periods when all three windings are energized.

DESCRIPTION OF THE PREFERRED EMBODIMENT

Figure 1A:
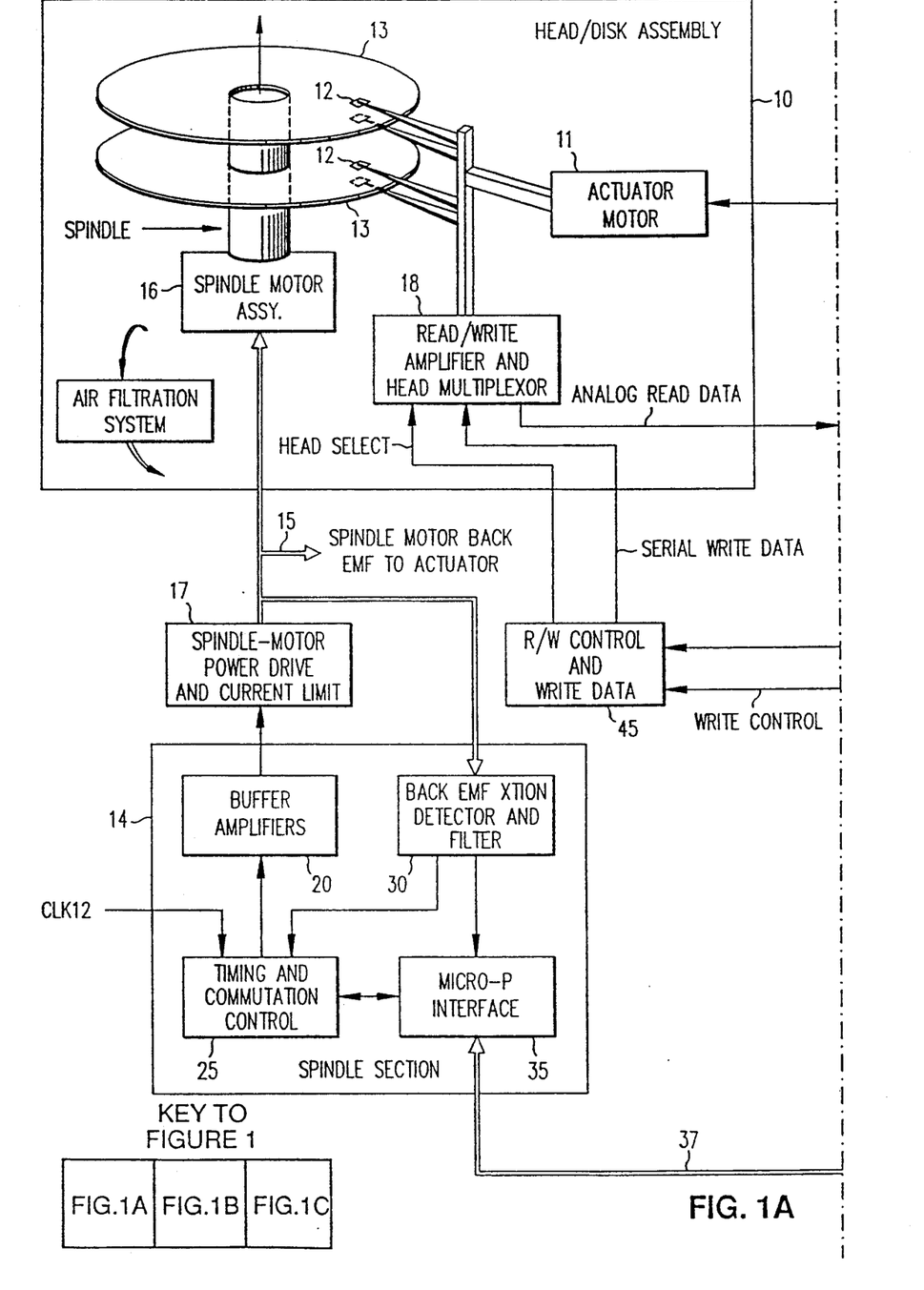
FIGS. 1A, 1B and 1C, when placed side by side, illustrate the mechanical and electrical components of a disk drive system in which the present invention may be employed.

Referring to FIG. 1A, the disk drive system includes a head/disk assembly (HDA) 10 having therein an actuator motor 11 which may include a voice coil actuator which positions one or more read/write heads 12 to different radial positions relative to the surfaces of disks 13 (two of which are shown in FIG. 1A) of a disk drive. Disks 13 may contain a sector servo pattern such as the type disclosed and claimed in copending application Ser. No. 07/714,102, filed Jun. 11, 1991, titled "Integrated Servo System" (M1560) and assigned to the same assignee as the present application. That application is incorporated herein by reference.

HDA 10 also includes read/write amplifier and head multiplexor circuitry 18 which is controlled through elements shown in enclosure 19 (FIG. 1B) and through read/write control circuitry 45 (FIG. 1A) for controlling the writing of data and the reading of data and servo information. Read/write amplifier and head multiplexor 18 may be a type SSI 32R510A/510AR Read/Write Device (510AR) manufactured by Silicon Systems of Tustin, Calif. That device provides a write current source which is controlled by an externally supplied write current signal and which supplies a write driver for generating a write current to be supplied through a multiplexor to the particular one of heads 12 selected for writing. The 510AR device also contains a read preamplifier and read buffer for supplying read data through the multiplexor from the particular head selected for reading. A mode select signal determines whether the device is to operate in a read mode or a write mode.

Figure 1B:
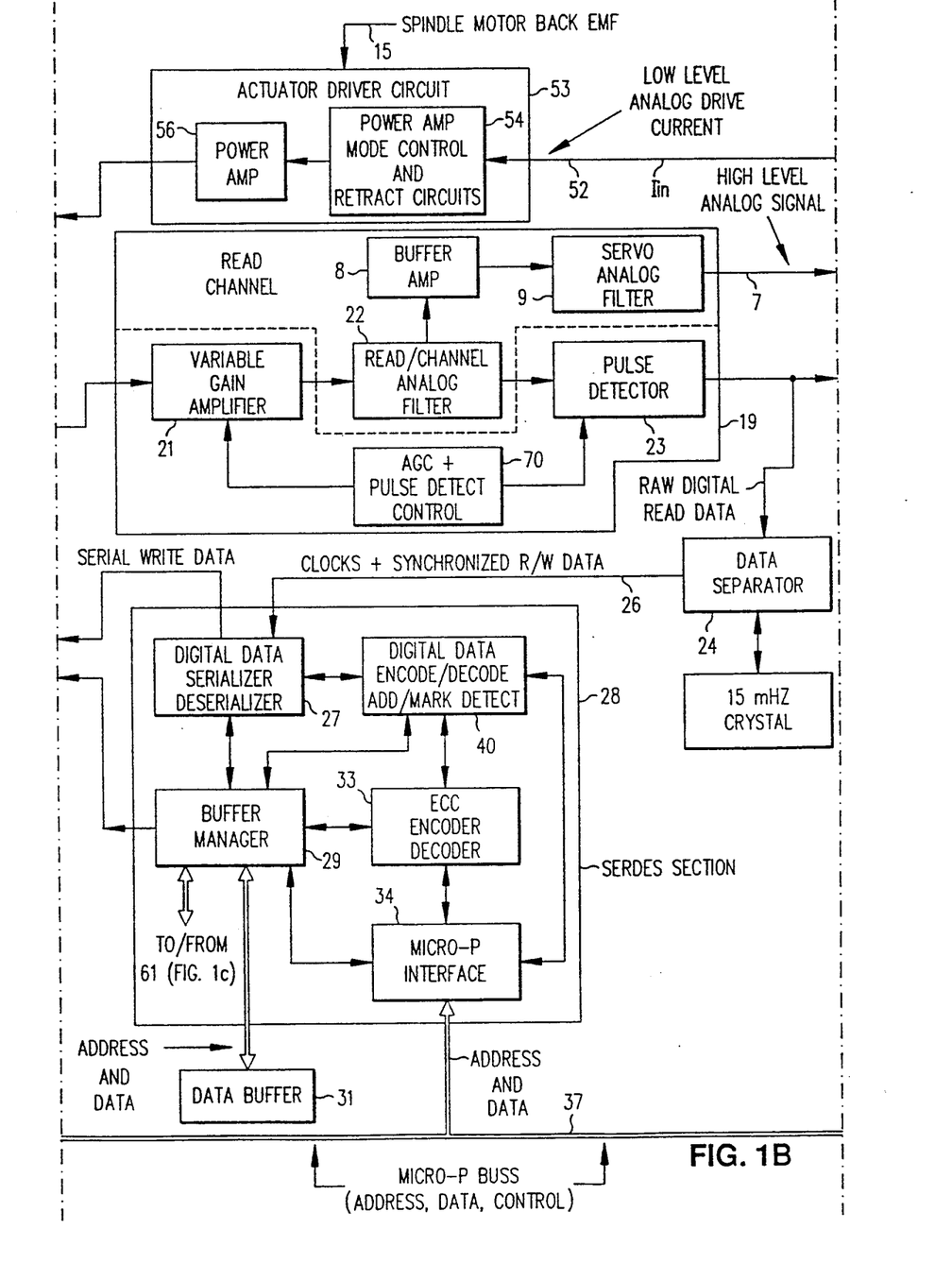
Figure 1C:
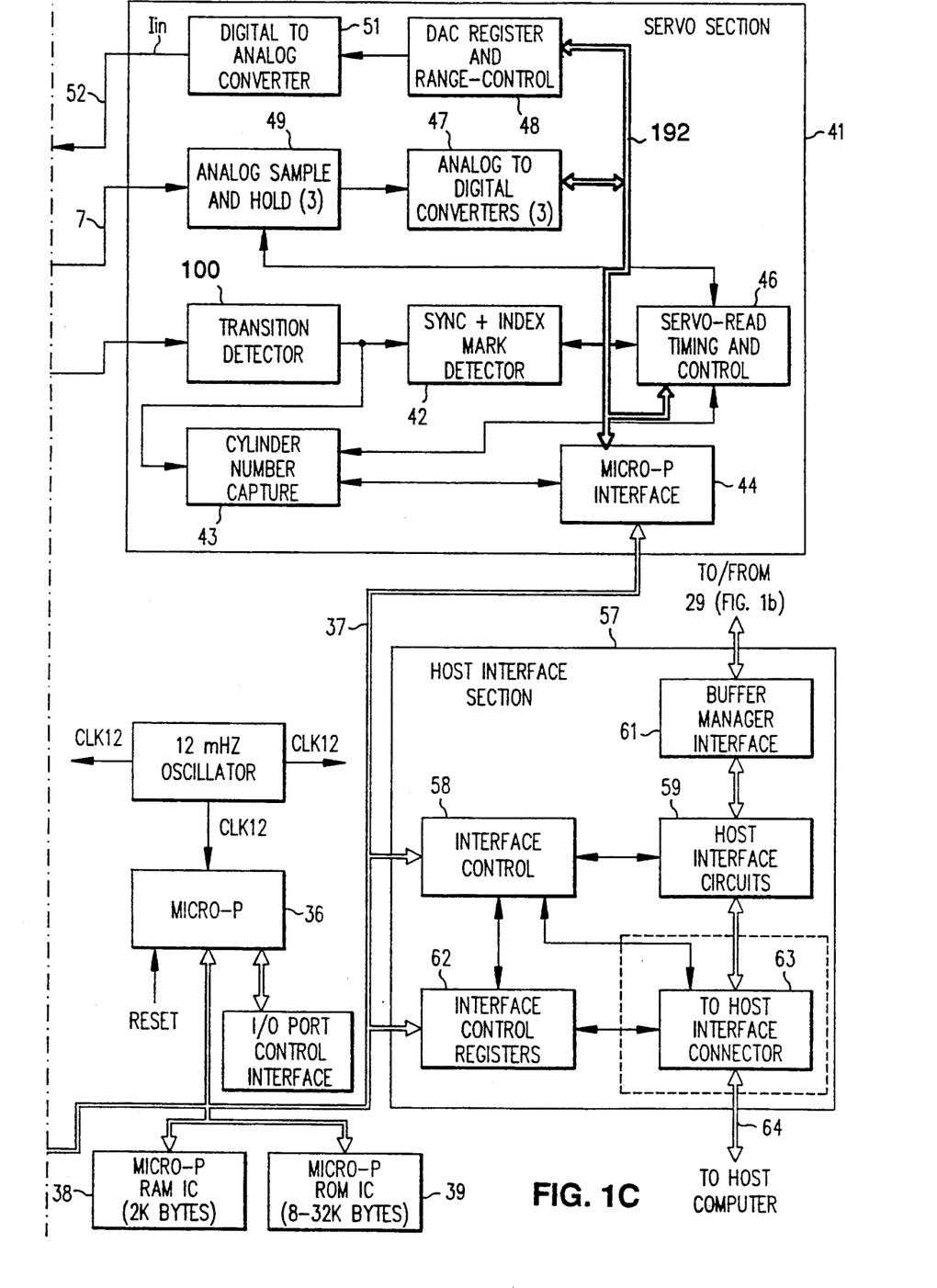

Read channel 19 includes a variable gain amplifier 21 which receives read data from circuitry 18 in the HDA and supplies it to a read channel analog filter 22. The output from circuitry 22 is supplied to an AGC and pulse detect control circuitry 70 and to a pulse detector 23. The output of pulse detector 23 is supplied as to a data separator 24 as raw de digital read data. Element 19 also includes a buffer amplifier 8 which receives an input from read channel analog filter 22 and supplies an output signal to a servo analog filter element 9. The output of servo analog filter 9 is supplied as a high level differential analog signal on a line 7 to analog sample and hold circuitry 49 (FIG. 1C).

The output of data separator 24 (FIG. 1B) is supplied as synchronized serial read data on a line 26 to a digital data serializer/deserializer (SERDES) 27 in the SERDES section 28. Read data from circuitry 27 is supplied to a data control and buffer manager 29 whose output is supplied to a data buffer 31. An output from buffer manager 29 is supplied as a Write Control signal to circuitry 45 in FIG. 1A.

SERDES section 28 includes an error correction code (ECC) encoder/decoder 33 for encoding and decoding ECC information in the data and other recorded information, as is well known in the art. Section 28 also has digital data encode/decode and address mark detection circuitry 40 connected to digital serializer/deserializer 27 and to ECC circuitry 33.

Section 28 further includes microprocessor interface circuitry 34 for interfacing with a microprocessor 36 (FIG. 1C) through a microprocessor bus 37 which carries address, control and data information, as is well known in the art. Microprocessor 36 has access to a random access memory (RAM) 38 and a read only memory (ROM) 39, as is common in the microprocessor art.

The system in which this invention is employed further includes a servo section 41 (FIG. 1C) for detecting and processing servo information from one or more of disks 13 relating to servo bursts, SYNC pulses, and track number indicating radial position of heads 12 relative to the disk surface. Details of this portion of the system are disclosed and claimed in the above-identified copending application "Integrated Servo System", as one type of circuitry which may be employed to detect the information in the servo pattern.

Servo section 41 includes SYNC and index mark detector circuitry 42 which receives information from pulse detector 23 in read channel 19 (FIG. 1B) through transition detector circuitry 100 (FIG. 1C). Circuitry 100 may be of the type shown and claimed in copending application Ser. No. 07/372,274, filed Jun. 27, 1989, titled "Pulse Detector Circuitry" and assigned to the same assignee as the present application. That application is incorporated herein by reference. Circuitry 42 generates information relative to the detection of sync pulses and the index mark on the one of the surfaces of disks 13 from which a selected head 12 is reading. Circuitry 42 is connected to servo-read timing and control circuitry 46 which in turn is connected to cylinder number capture circuitry 43. Circuitry 43 generates an identification of the particular cylinder or radial position on the disks 13 at which heads 12 are located.

Servo section 41 also includes microprocessor interface circuitry 44 which connects to microprocessor 36 through bus 37 and operates to control, through a bus 192, the flow of information relative to servo read timing and control circuitry 46, analog-to-digital (A-to-D) converter circuitry 47 (which contains three such A-to-D converters in the preferred embodiment of the invention) and digital-to-analog (DAC) register and range control circuitry 48. Circuitry 47 receives three input signals from analog sample and hold circuitry 49, which signals represent the amplitudes of the different sector servo bursts A, B and C detected on the selected surface of one of disks 13, in a manner described in more detail in the above identified copending application titled "Integrated Servo System".

The output from circuitry 48 is supplied to DAC converter circuitry 51 which generates a low level actuator control signal $I_{in}$ on a line 52 (FIGS. 1B and 1C) which is supplied as an input to the actuator driver circuitry 53 (FIG. 1B). Circuitry 53 includes power amplifier mode control and retract circuitry 54 which supplies an actuator drive signal to a power amplifier 56 which in turn supplies control current to actuator motor 11 in HDA 10 (FIG. 1A). Circuitry 53 receives a signal on the line 15 which is a measure of the back EMF of spindle motor 16 and which is used in actuator retract operations.

Details of the actuator control circuitry are described and claimed in copending application Ser. No. 07/714,106, filed Jun. 11, 1991, titled "Disk File Head Positioner Driver Circuitry" (M811) (K35A1014USA), assigned to the same assignee as the present application. That application is incorporated herein by reference. The overall system also includes a host interface section 57 (FIG. 1C) which includes interface control circuitry 58, host interface circuits 59, buffer manager interface circuitry 61, interface control registers 62, and a host interface connector 63. Buffer manager interface 61 communicates as indicated with buffer manager 29 shown in FIG. 1B. As is well known in the art, host interface section 57 operates to provide control and information paths between a host computer (not shown) through a bus 64 and the elements shown in FIGS. 1A, 1B and 1C through bus 37.

The portion of the system shown in FIG. 1A also includes spindle motor control circuitry in accordance with the present invention. This includes a driver section 14 for controlling the spindle drive motor assembly 16 in HDA 10 through spindle motor power drive and current limit circuitry 17 for rotating magnetic disks 13 in accordance with the present invention. Spindle section 14 includes buffer amplifiers 20, timing and commutation control circuitry 25, back EMF detector and filter circuitry 30 and microprocessor interface circuitry 35. As discussed above, line 15 connected electrically to spindle motor power 17 provides a measure of the back EMF of the motor assembly and is supplied to the actuator positioning circuitry 53.

Figure 2:
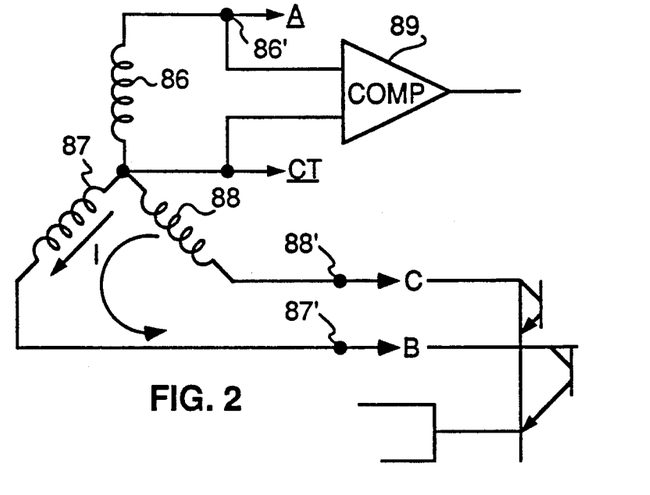
FIG. 2 illustrates the connections of the three phase windings and the center tap connection for measuring the signal across one phase winding in accordance with the present invention.

Referring to FIG. 2, the windings 86, 87, and 88 of a conventional brushless DC motor are illustrated. The windings are labeled A phase 86, B phase 87, and C phase 88. Terminals 86', 87' and 88', respectively, represent terminals for the different phase windings. The phase windings of the present invention also have a center tap node connection having one terminal connected to the junction of the phase windings 86, 87, 88, and having another terminal labeled center tap CT. The output across center tap terminal CT and terminal 86', corresponding to the A phase, is supplied to the input terminal of a comparator network 89.

Each mechanical revolution of the motor is made up of a number of electrical cycles of the motor. Electrical cycles refer to the repeatable electromagnetic properties that occur as the rotor of the motor is moved through one mechanical revolution. Usually, one set of phase winding energization sequences is repeated for each electrical cycle. Motors employed in the present embodiment may have four electrical cycles per mechanical revolution. With six energization pulses per electrical cycle, there are 24 pulses per mechanical revolution. Of course, they may be as few as one electrical cycle or as many as the application requires.

Figure 3:
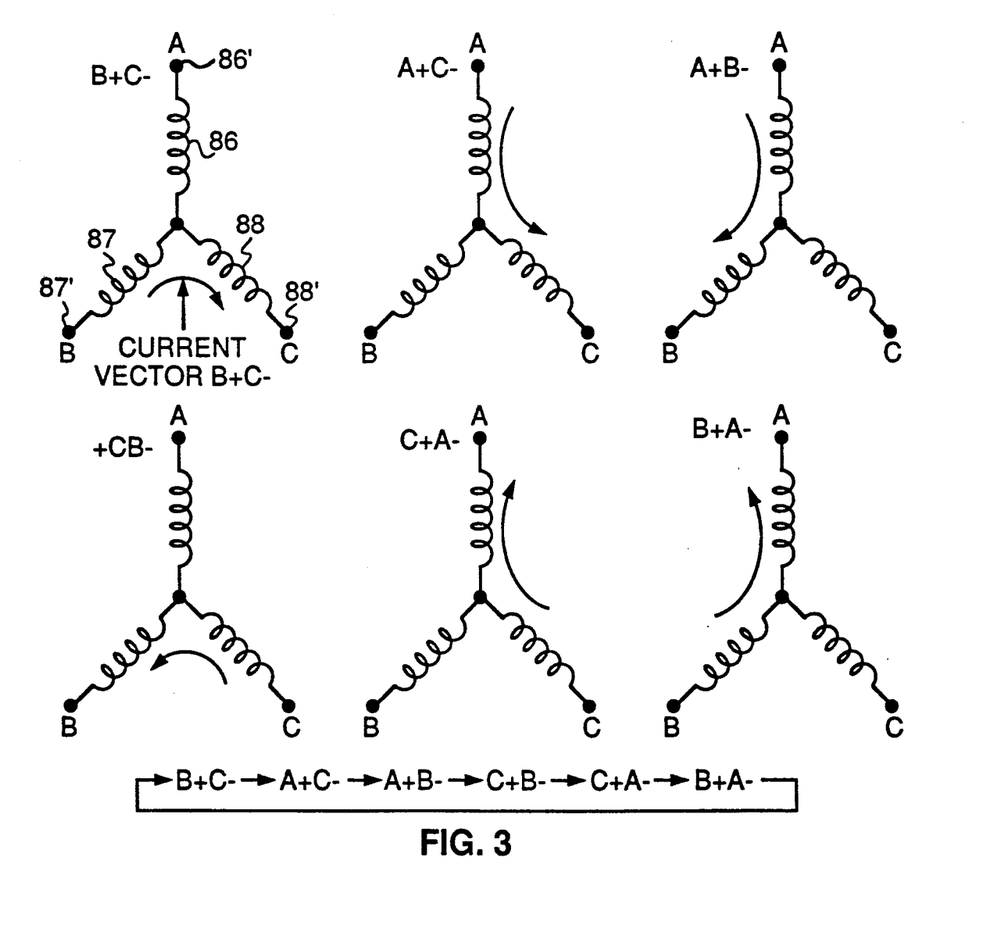
FIG. 3 shows the preferred sequence of motor phase energization of this invention.

As is well known in the art, windings A, B, and C of the motor are energized in pairs in sequence. For example, as shown in FIG. 3, in the present invention the sequence of energization may be as follows: B+C−, A+C−, A+B−, C+B−, C+A−, and B+A−. The notation B+C− indicates that a positive voltage is applied to B phase 87 and terminal 87', while a negative voltage is applied across C phase 88 and terminal 88', resulting in the current flow from terminal 87' through winding 87 and winding 88 to terminal 88', labeled as current vector B+C− in FIG. 3. As indicated above, one embodiment of the present invention operates to sense the voltage between terminal CT and terminal 86' at a time when coil 86 is not energized. That is, the energization should occur through only coils 87 and 88 during the time of sampling between terminal 86' and CT. Thus, the sample from coil 86 at a time when no current is flowing therethrough is relatively noise-free and spike-free.

Figure 4:
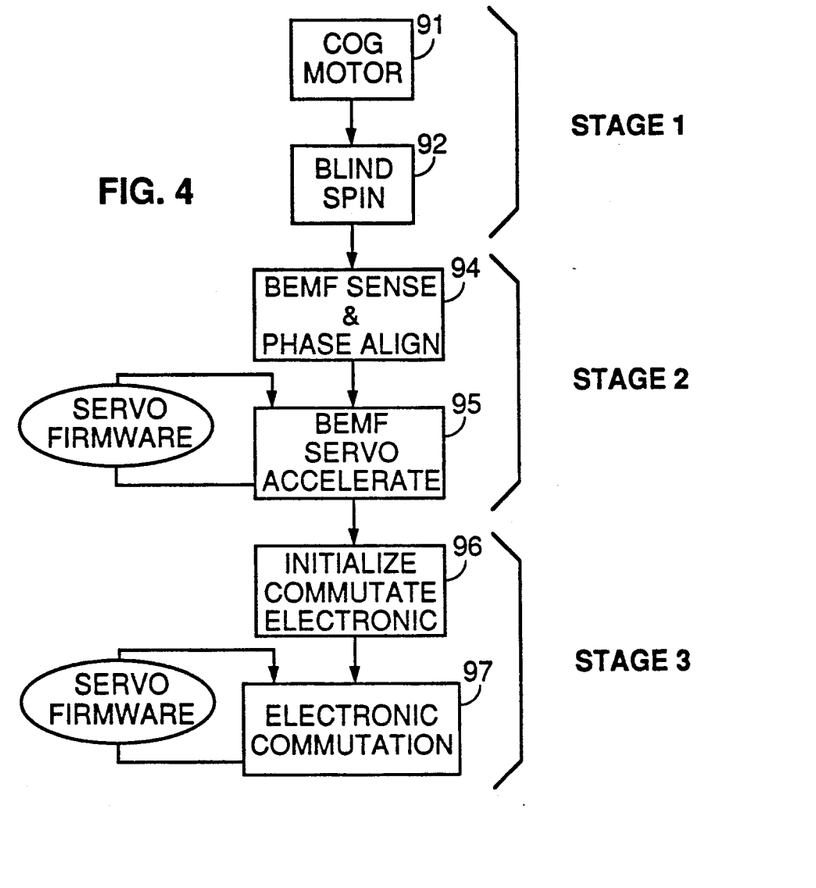
FIG. 4 is a flow chart showing the three stages of motor operation employed in the present invention.

The flow chart of FIG. 4 illustrates the complete three-stage operation of the system, starting with the rotor at full stop or rest position, after which it enters stage 1. At the start of this stage, the rotor of the motor is first "cogged" or moved to a specific phase position, represented by block 91, by energizing a particular phase pair.

After reaching the specific phase position, a preprogrammed "blind" commutation sequence represented by block 92 consists of a specific sequence of phase energization and deenergization. During this blind commutation sequence, the phase windings are first energized for a period of time to produce movement of the rotor, with no feedback information supplied as to rotor position.

At some velocity, represented by block 94, the measured back EMF is acceptably high and the system then switches to stage 2. During stage 2 the system monitors the back EMF of the motor as a measure of rotational velocity and, utilizing servo firmware as is well known in the art, continues to accelerate the motor, represented by block 95. Once the motor has reached the desired speed, representing stage 3, the system initializes the commutation electronics, represented by block 96, and continues to control the motor current. The system then continues through electronic commutation, represented by block 97, to maintain the proper constant rotational motor velocity, utilizing the servo firmware.

The principle of blind spinup discussed above is that at low commutation speeds the rotor behaves as a stepper motor would, by assuming an angular position depending on the phase winding pair energization. Commutation is the sequence of phase winding energizations to incrementally move the rotor through its revolutions. As the rotor gathers angular velocity, the commutation time period is reduced at a predictable rate and the rotor rotates progressively faster.

During the second or back EMF measurement stage of the invention which follows the blind spinup stage, all the drive signals are inhibited for one or more electrical cycle times, thereby eliminating drive pulse noises, so that small signals of back EMF can be sensed without error. Essentially, the servo firmware in the back EMF circuitry stops the drive pulses, and back EMF is sensed for a period of time.

From stage 2 onwards, the motor speed is controlled by sensing the timing of the back EMF polarity changes and computing the phase winding pair energization timing. For a three phase motor in a commutation technique, within each electrical cycle a pair of phase windings is energized in a specific sequence. The computational technique energizes the phase windings approximately within the period of the commutation times except during the special energizing sequences, referred to earlier, that occur during the first stage. In this embodiment, the phase windings are energized or pulsed at least once within each commutation time; that is, at least six times within an electrical cycle.

In the computation technique, the timing of the drive pulses of phase winding energization and the time period of the pulses, from a rotational position reference point, are calculated. The time period of the pulses are normalized to a duty cycle, where the maximum possible time period represents 100% duty cycle. The characteristic reference point within an electrical cycle is the back EMF polarity reversal point for one selected phase winding. The relationship between the back EMF reference point and the drive pulses within the electrical cycle is the "phase relationship". The computation technique then calculates the three quantities: the time period, the duty cycle and the phase relationship. In the computational method, the duration and the time period are controlled directly, and therefore the system avoids placing drive pulses at those times. Also, in the computational method, the characteristics of the previous revolutions of the motor and the drive pulses supplied during those revolutions are used to compute and provide the new set of drive pulses for the present revolution timed from the back EMF polarity switching point.

Figure 5:
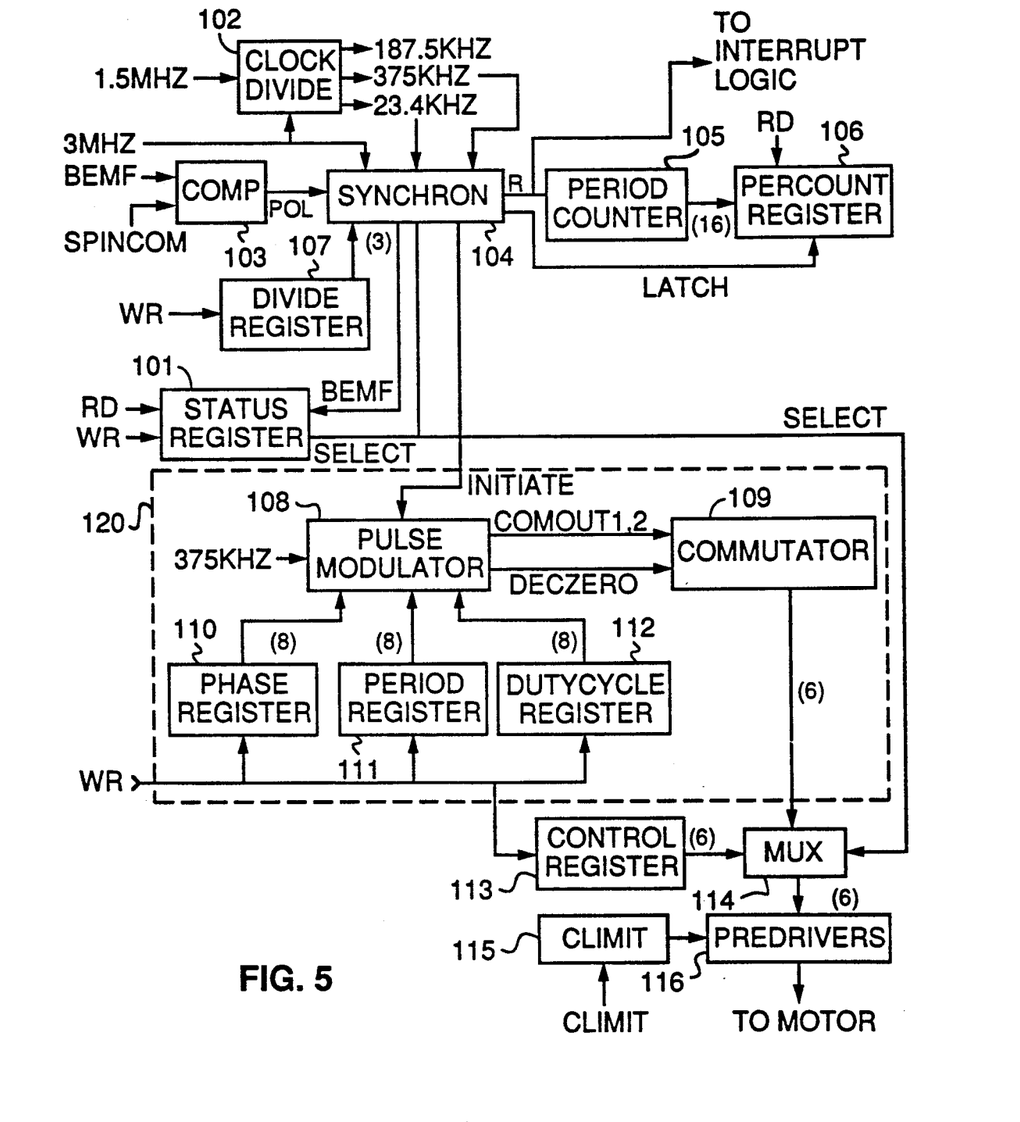
FIG. 5 is a block diagram illustrating one implementation of circuitry for practicing the invention.

One implementation of the sensing of the back EMF, the computation of the time period, the duty cycle and the phase relationship and the energization (or driving) of the stator phase windings is shown in FIG. 5. As shown in FIG. 5, a status register 101 is provided which can be read from or written into by microprocessor 36. The circuitry of FIG. 5 also includes clock divide circuitry 102, a comparator block 103, a synchronizer 104, a period counter 105, a period count register 106, and a divide register 107. Also shown are motor commutation and drive logic elements including a pulse modulator 108, a commutator 109, a phase register 110, a period register 111, a duty cycle register 112, a control register 113, a multiplexor (MUX) 114, a current limiter 115, and a set of predrivers 116. The blocks 108, 109, 110, 111 and 112 are the commutation logic elements, as represented by the dotted enclosure 120.

The commutation logic elements are used only after the motor has reached speed and when the system is to automatically cycle through the motor phases. During cogging and spin up, the first parts of motor operation, the commutation logic is disabled by turning on a bit in status register 101. When the motor is initially turned on, control register 113 is reset such that none of the predrivers in block 116 are on. Also, status register 101 disables commutation logic 120, so that MUX 114 is directed to take its inputs from control register 113.

Thus, when first turned on, block 113 is controlling predrivers 116 and they are all turned off. To start the motor, microprocessor 36 writes into the control register 113, into any two of the six bit positions in that register, a pattern to determine which motor phases are to be turned on. For example, if microprocessor 36 turns on A high and B low, representing phase A+B−, a plus voltage is applied to the phase A terminal 86', and a ground or negative voltage is applied to the phase B terminal 87' of the windings. This will result in "cogging" of the motor in preparation to perform a blind spin up. This causes the rotor of the motor to align itself at the energized motor phase and then stop.

After "cogging", the contents of control register 113 are modified sequentially by microprocessor 36 to cause rotation of the motor rotor in a clockwise direction as shown in FIG. 3. That is, during the blind spin portion of motor operation, microprocessor 36 writes into control register 113 to sequentially energize predetermined phase pairs of the motor for predetermined periods of time. These periods of energization are for ever-diminishing amounts of time for each given phase, so that the motor accelerates to a speed of, say, around 400 rpm on the blind spin.

Feedback information is gathered when the microprocessor periodically turns off all motor phases and senses back EMF position. Back EMF comparator block 103 causes a bit to be set in status register 101 through synchronizer 104 whenever a back EMF transition occurs. Thus, the microprocessor periodically, on the basis of the servo firmware, turns off the drive to the motor by resetting all the bits in control register 113, and then resets the back EMF bit in status register 101. After a wait for a predetermined time interval, another back EMF transition should occur and set a bit in the status register. At the time, the microprocessor is in phase with the back EMF transition and it begins writing more information to control register 113 at a rate designed to accelerate the motor.

At the end of the next burst of writing bits to control register 113, the microprocessor again waits for a back EMF transition. Thus, interspersed over the order of a quarter or a half of a motor spin, are short periods of commutation produced by writing to control register 113, mixed with short periods of examining the back EMF bit to determine how fast the motor is going. This use of servo firmware to spin the motor results in a much faster spin-up than could be achieved if an attempt were made to reach top speed with a blind spin.

After the blind spin achieves the target speed or near it, the microprocessor writes into phase register 110, period register 111, and duty cycle register 112 some initial values of commutation parameters, and turns on a bit in status register 101 which enables commutation. The commutation logic has now been initialized and turned on, but it will not actually begin operating until another back EMF transition occurs. Because of this, the commutation logic is in synchronization with back EMF at the moment the commutation logic actually begins operating. The preferred manner of using the commutation logic is to complete a fixed cycle for each electrical cycle of the motor, four of these electrical cycles making up a mechanical revolution of the motor.

The motor speed is measured during a mechanical revolution by period counter 105. The period counter is reset when commutator 109 is turned on and it counts through the number of electrical cycles indicated by the divide register 107. Once that number of electrical cycles has occurred, the contents of the period counter are saved in period count register 106, and the period counter is reset and starts counting again.

The saving of the period count register and the completion of the number of electrical cycles called for in the divide register not only causes the period count register to be saved, but it also causes a microprocessor interrupt. The microprocessor then reads the period count register and determines the motor speed that was actually achieved by evaluating the count in that register. The period count is the total number of 187.5 kilohertz clock pulses that have occurred in the four electrical cycles, (that is, if four is specified in divide register 107). Thus, once per revolution an interrupt to the microprocessor occurs, and the microprocessor examines the period count register to determine motor speed. The microprocessor, within a certain time window after receiving that interrupt, can rewrite values in the phase, period and duty cycle registers 110, 111, and 112, respectively, thereby adjusting the drive current supplied to the motor if the period count register indicates that the motor is going either too fast or too slow. Usually, all that is required is to change duty cycle register 112 to adjust the motor speed.

Pulse modulator 108 includes a counter which, during each of the six electrical cycles that make up a motor electrical cycle, counts up until it matches the count value in period register 111 and then it counts down. During the count up time, the value in duty cycle register 112 is compared to that in period register 111 and when the duty cycle value matches the period register value, an operative pair of bits in predrivers 116 are turned on. As the modulator 108 continues to count up and then begins to count down, when the value in the period count register no longer exceeds the value in the duty cycle register, the operative predrivers are turned off. Thus, the duty cycle register, operating against the count value in the pulse modulator, determines at what time the control register is turned on and turned off in a given commutation period.

Phase register 110 is used to align the motor phase with the drive phase. When a back EMF transition occurs, the contents of the phase register are set into the counter in pulse modulator 108. The back EMF is determined by the output of comparator 103. Ordinarily the back EMF transition occurs in the period of one of the six commutate cycles. When that occurs, if everything is phased precisely, loading of the phase register should cause no change in the counter in the pulse modulator. In practice, however, there are slight speed variations that cause the count to misalign so that the effect of this phase alignment is to change the duration of the up-/down count performed by the pulse modulator, with the result that the peak of the up/down counter of the drive occurs precisely at the moment of a back EMF transition.

Figure 6:
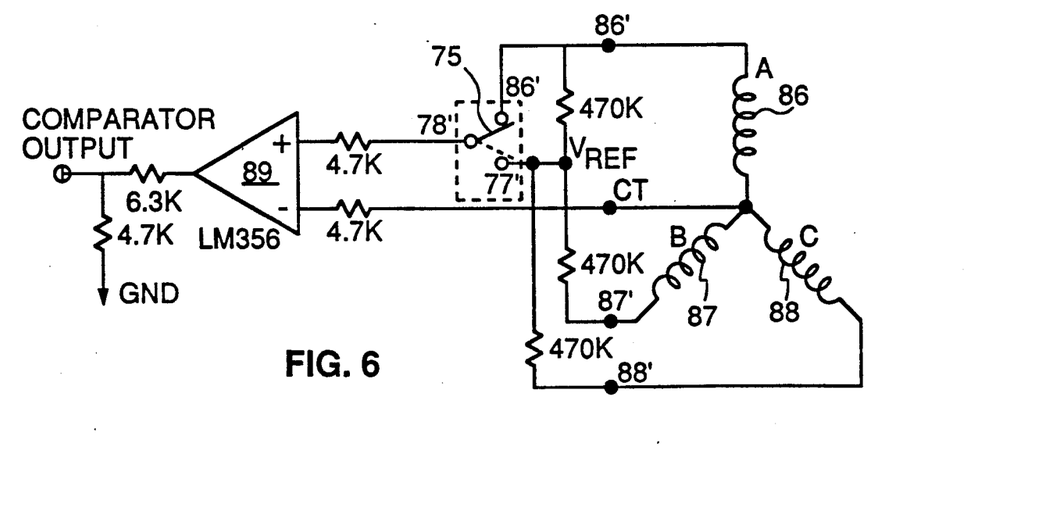
FIG. 6 illustrates the connection of the three phase windings and the center tap node in an alternate ratiometric inductance method for starting the motor.

As an alternative to energizing an arbitrary phase winding pair at startup and relying on that to move the rotor to a known angular position, the relative inductances of the windings can be sensed in a ratiometric method. The back EMF voltage sensing comparator 89 can be used for this purpose also, as shown in FIG. 6. The comparator reference voltage terminal 78' is changed from outer terminal connection terminal 86' to a terminal 77' connected to a voltage source $V_{REF}$ which is half the voltage applied across the pair of phase windings. One pair of phase windings is momentarily energized and the comparator senses the center tap node voltage.

If winding A has a higher inductance than winding B, and if the source voltage was applied to winding A and winding B was the return, then the center tap node voltage would be below the reference voltage $V_{REF}$, since the voltage drop across winding A would be greater than that across winding B. Comparisons of relative inductance between windings B and C, between windings A and C, and between windings A and B gives 3 values which will locate the rotor within one of eight zones in an electrical cycle. Knowing position within as many as eight zones permits selection of a phase energization which will minimize the amount and the probability of reverse rotation of the rotor.

Using this technique, average reverse rotation of the rotor per initialization is reduced to one third of the average reverse rotation which occurs when ratiometric inductance sensing is not used.

I claim:

1. Motor driver circuitry for controlling the operation of a brushless DC type motor to rotate revolving magnetic disks in a hard disk drive, the motor being of the type having a permanent magnet rotor connected to the revolving magnetic disks and magnetically coupled to a stator including a plurality of phase windings each having an outer terminal and a common center terminal configured to be individually energized in a sequence to cause the rotor to rotate unidirectionally, the motor drive circuitry comprising;

sensing circuit means connected between the common center terminal and an outer terminal of one of the plurality of phase windings for determining an initial angular position of the rotor;

timing circuit means for providing a timing reference signal synchronized with the rotor to define a succession of time intervals such that each time interval marks the movement of the rotor through a known rotation angle;

a micro processor including;

first sequencing means having a first and a second operational phase, said first sequencing means being responsive to the determined initial angular position of the rotor for providing an energization signal to said phase windings to cause the rotor to move in a single direction to a predetermined angular position with respect to the stator phase windings in the first operational phase, said first sequencing means thereafter supplying a sequence of energization signals to said phase windings to cause the rotor to rotate from its initial position and accelerate to a predetermined intermediate rotational velocity in the second operational phase;

second sequencing means having a signal processing input for receiving said timing reference signal, said second sequencing means successively providing a stator phase winding energization sequence to cause the rotor to accelerate from the predetermined intermediate rotational velocity to a predetermined final rotational velocity, said second sequencing means having means for periodically comparing a time interval of the timing reference signal to a corresponding time interval of the energization sequence and for computing a next phase winding energization sequence for use in correcting any error in rotor angular velocity;

control circuit means for providing a control signal when the desired final rotational velocity is reached; and commutator circuit means having a signal processing input for receiving the said reference signal and having a control input for receiving said control signal, said commutator circuit means being responsive to said control signal and having means responsive to said timing reference signal for providing a phase winding energization sequence to cause the rotor to maintain its predetermined final rotational velocity.

2. Motor driver circuitry in accordance with claim 1, wherein said commutator circuit means further includes first signal storing circuit means responsive to said timing reference signal for producing and temporarily storing a stored signal that represents at least one integer multiple of an actual time interval of rotor rotation.

3. Motor drive circuitry in accordance with claim 2, wherein said microprocessor compares the stored actual time interval of rotor rotation to a desired time interval of rotor rotation and calculates a set of operational signals for use in correcting any error in actual rotor rotational velocity from its desired final rotational velocity.

4. Motor driver circuitry in accordance with claim 3, wherein said commutator circuit means further includes second signal storing circuit means for receiving and temporarily storing the set of calculated operational signals from said microprocessor such that each signal in the set represents a commutation parameter used to provide a phase winding energization sequence.

5. A method for controlling the operation of a brushless DC type motor to rotate revolving magnetic disks in a hard disk drive, the motor being of the type having a permanent magnet rotor connected to the revolving magnetic disks and magnetically coupled to a stator including a plurality of phase windings each having an outer terminal and a common center terminal configured to be individually energized in a sequence to cause the rotor to rotate unidirectionally, comprising the steps of;

sensing the voltage between the common center terminal and an outer terminal of one of the plurality of phase windings to determine an initial angular position of the rotor;

providing a timing reference signal synchronized with the rotor to define a succession of time intervals such that each time interval marks the movement of the rotor through a known rotation angle;

providing a first sequencing means having a first and a second operational phase, said first sequencing means being responsive to the determined initial angular position of the rotor for providing an energization signal to said phase windings to cause the rotor to move in a single direction to a predetermined angular position with respect to the stator phase windings in the first operational phase, thereafter supplying a sequence of energization signals from said first sequencing means to said phase windings to cause the rotor to rotate from its initial position and accelerate to a predetermined intermediate rotational velocity in the second operational phase;

providing a second sequencing means having a signal processing input for receiving said timing reference signal, said second sequencing means successively providing a stator phase winding energization sequence to cause the rotor to accelerate from the predetermined intermediate rotational velocity to a predetermined final rotational velocity, said second sequencing means periodically comparing a time interval of the timing reference signal to a corresponding time interval of the energization sequence and computing a next phase winding energization sequence for use in correcting any error in rotor angular velocity;

providing a control signal when the desired final rotational velocity is reached; and processing said timing reference signal and said control signal for providing a phase winding energization sequence to cause the rotor to maintain its predetermined final rotational velocity.

6. A method in accordance with claim 5, including the steps of producing and temporarily storing a stored signal that represents at least one integer multiple of an actual time interval of rotor rotation.

7. A method in accordance with claim 6, including the steps of comparing actual time interval of rotor rotation to a desired time interval of rotor rotation; and calculating a set of operational signals for use in correcting any error in actual rotor rotational velocity from its desired final rotational velocity.

8. A method in accordance with claim 7, including the step of receiving and temporarily storing the set of calculated operational signals from a microprocessor such that each signal in the set represents a commutation parameter used to provide a phase winding energization sequence.

* * * * *